(12) United States Patent
Blonigen et al.

(10) Patent No.: US 7,871,009 B1
(45) Date of Patent: Jan. 18, 2011

(54) RFID LABEL DISPENSER

(75) Inventors: Craig Blonigen, Andover, MN (US);
Chad Modesette, New Richmond, WI (US); Matt Thoreson, Stillwater, MN (US); Daryl Norgard, North Branch, MN (US); Leo Aleiner, Eagan, MN (US); Ken Koehler, Frederic, WI (US); Dan Murtin, Minneapolis, MN (US)

(73) Assignee: Lowry Computer Products, Inc., Brighton, MI (US)

( * ) Notice: Subject to any disclaimer, the term of this patent is extended or adjusted under 35 U.S.C. 154(b) by 1160 days.

(21) Appl. No.: 11/502,161

(22) Filed: Aug. 10, 2006
(Under 37 CFR 1.47)

(51) Int. Cl.
*G06K 19/00* (2006.01)
(52) U.S. Cl. ...................... 235/487; 235/488
(58) Field of Classification Search ............ 235/472.01, 235/487–488; 221/72; 156/541, 344, 584
See application file for complete search history.

(56) References Cited

U.S. PATENT DOCUMENTS

| | | | |
|---|---|---|---|
| 6,104,291 A | 8/2000 | Beauvillier et al. | |
| 6,121,880 A | 9/2000 | Scott et al. | |
| 6,140,146 A | 10/2000 | Brady et al. | |
| 6,163,260 A | 12/2000 | Conwell et al. | |
| 6,231,253 B1* | 5/2001 | Henderson et al. | 400/618 |
| 6,246,326 B1 | 6/2001 | Wiklof et al. | |
| 6,280,544 B1 | 8/2001 | Fox et al. | |
| 6,294,998 B1 | 9/2001 | Adams et al. | |
| 6,352,094 B1 | 3/2002 | Gunderson et al. | |
| 6,369,711 B1 | 4/2002 | Adams et al. | |
| 6,422,476 B1 | 7/2002 | Ackley | |
| 6,597,465 B1 | 7/2003 | Jarchow et al. | |
| 6,610,379 B1 | 8/2003 | Adams et al. | |
| 6,645,327 B2 | 11/2003 | Austin et al. | |
| 6,677,852 B1 | 1/2004 | Landt | |
| 6,794,000 B2 | 9/2004 | Adams et al. | |
| 6,962,292 B1 | 11/2005 | Benton et al. | |
| 7,014,729 B2 | 3/2006 | Grabeau et al. | |
| 2002/0038693 A1* | 4/2002 | Brough et al. | 156/541 |
| 2002/0117263 A1* | 8/2002 | McKenney et al. | 156/361 |
| 2003/0063139 A1* | 4/2003 | Hohberger et al. | 347/2 |
| 2003/0071051 A1* | 4/2003 | Martinsen | 221/70 |
| 2004/0079490 A1* | 4/2004 | Ito | 156/584 |
| 2005/0279463 A1* | 12/2005 | Ridenour | 156/541 |
| 2006/0081708 A1 | 4/2006 | Blonigen et al. | |

* cited by examiner

*Primary Examiner*—Thien M. Le
*Assistant Examiner*—Sonji Johnson
(74) *Attorney, Agent, or Firm*—Crawford Maunu PLLC

(57) ABSTRACT

Maintaining faulty radio frequency identification (RFID) labels on a surface of a web carrier. The various embodiments of the invention provide apparatus for controlling whether RFID labels are separated from a label web. In one embodiment, a frame has first and second side members, and a peel bar is mounted between the first and second side members. The peel bar has a radial portion that causes an RFID label to be separated from the surface of the web carrier as the web carrier contacts and travels over the radial portion. A cam bar is mounted on the frame and is rotatable. In a first position the cam bar causes the web carrier to contact and travel at least partially around the radial portion of the peel bar, and in a second position the cam bar prevents the web carrier from contacting and traveling at least partially around the radial portion of the peel bar.

17 Claims, 9 Drawing Sheets

RFID LABEL DISPENSER

FIELD OF THE INVENTION

The present invention relates generally to dispensing of Radio Frequency IDentification (RFID) labels.

BACKGROUND

Label dispensing units for applying labels to advancing articles have come into widespread use in a variety of industries. Print-and-apply label dispensing systems are today's cost-effective solution for labeling products, cartons, cases, and pallets. Generally, these types of systems feature a unique modular design that couples a variety of commercially available print engine modules to one of several label applicators through a standard chassis. In operation, the print-and-apply label dispensing system produces high quality, "on-demand" labels and applies them automatically in a single, easy operation to advancing articles. Exemplary print engine modules are commercially available from Sato America, Inc. of Sunnyvale, Calif.; Zebra Technologies, Inc. of Vernon Hills, Ill.; and Datamax Corporation of Orlando, Fla.

Regardless of which print engine module is used, the label application process involves a series of roller assemblies. These roller assemblies control and guide the movement of the label web through the label dispensing unit. The application process involves changing the travel direction of the label web abruptly enough to impose a peel angle on the label web, which effectively separates the labels from the web for application to articles conveyed past the dispensing unit. The particular peel angle and the configuration of roller assemblies depends upon the label web and specific print engine module. The discarded label web is collected on a take-up roller.

The use of labels on products has evolved from merely being a manner of identification to being an important tool in inventory tracking and management. One major development in labeling was the introduction of bar codes on labels. Bar codes are used on a majority of products found in both retail stores and warehouses and are used to quickly and easily track inventory. Today, manufacturers are increasingly using a new, alternative inventory tracking label that incorporates Radio Frequency IDentification (RFID) technology. RFID involves remotely storing and retrieving data using devices called RFID tags or transponders. An RFID tag is a small object, such as an adhesive sticker (label), that can be attached to or incorporated into a product. RFID tags can receive and respond to radio-frequency-based queries from an RFID transceiver. Some advantages of RFID tags over bar codes include: detection without human intervention; placement inside other packaging; readability without being visible; readability may be less susceptible to being impaired by dirt, moisture, abrasion, or packaging contours; and the capability to both read and write to the tags. These improvements in label technology are accompanied, however, by a corresponding increase in the cost to those who use the labels.

The cost of RFID labels may provide an incentive for a user to prevent wasting labels. Ideally all RFID labels on a label web are functional and may be applied to the user's articles. However, in some circumstances an RFID label may be faulty and therefore unusable. Instead of discarding faulty labels, a user may wish to return them to the vendor or manufacturer of the labels for a refund or credit. However, the vendor or manufacturer may require that the returned RFID labels be physically preserved in order to verify that the labels are actually faulty.

SUMMARY

The present invention is directed to the above and related types of systems for application of RFID labels.

In one embodiment, an apparatus is provided for controlling whether RFID labels are separated from a label web carrier. A frame has first and second side members, and a peel bar is mounted between the first and second side members. The peel bar has a radial portion that causes an RFID label to be separated from the surface of the web carrier as the web carrier contacts and travels over the radial portion. A cam bar is mounted on the frame and is rotatable. In a first position the cam bar causes the web carrier to contact and travel at least partially around the radial portion of the peel bar, and in a second position the cam bar prevents the web carrier from contacting and traveling at least partially around the radial portion of the peel bar.

In another embodiment, an apparatus is provided for selectively dispensing radio frequency identification (RFID) labels disposed on a first surface of a web carrier. The apparatus includes means for advancing the web carrier; means for programming each RFID label on the advancing web carrier; means for determining success or failure to program an RFID label; a peel bar positioned to contact the second surface of the advancing web carrier, the peel bar having a peel edge with a radius of a size that causes an RFID label to be separated from the first surface of the web carrier as the second surface of the web carrier contacts and travels at least partially around the edge; a cam bar positioned to contact the second surface of the advancing web carrier, wherein the cam bar moved to a first position causes the second surface of the web carrier to contact and travel at least partially around the edge of the peel bar, and the cam bar moved to a second position prevents the second surface of the web carrier from contacting and traveling at least partially around the edge of the peel bar, wherein an RFID label remains affixed to the web carrier when the cam bar is in the second position and the web carrier advances over the peel bar; means, responsive to a success in programming an RFID label, for moving the cam bar to the first position; means, responsive to a failure in programming an RFID label, for moving the cam bar to the second position; and means for winding the advancing web carrier following advancement past the cam bar.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
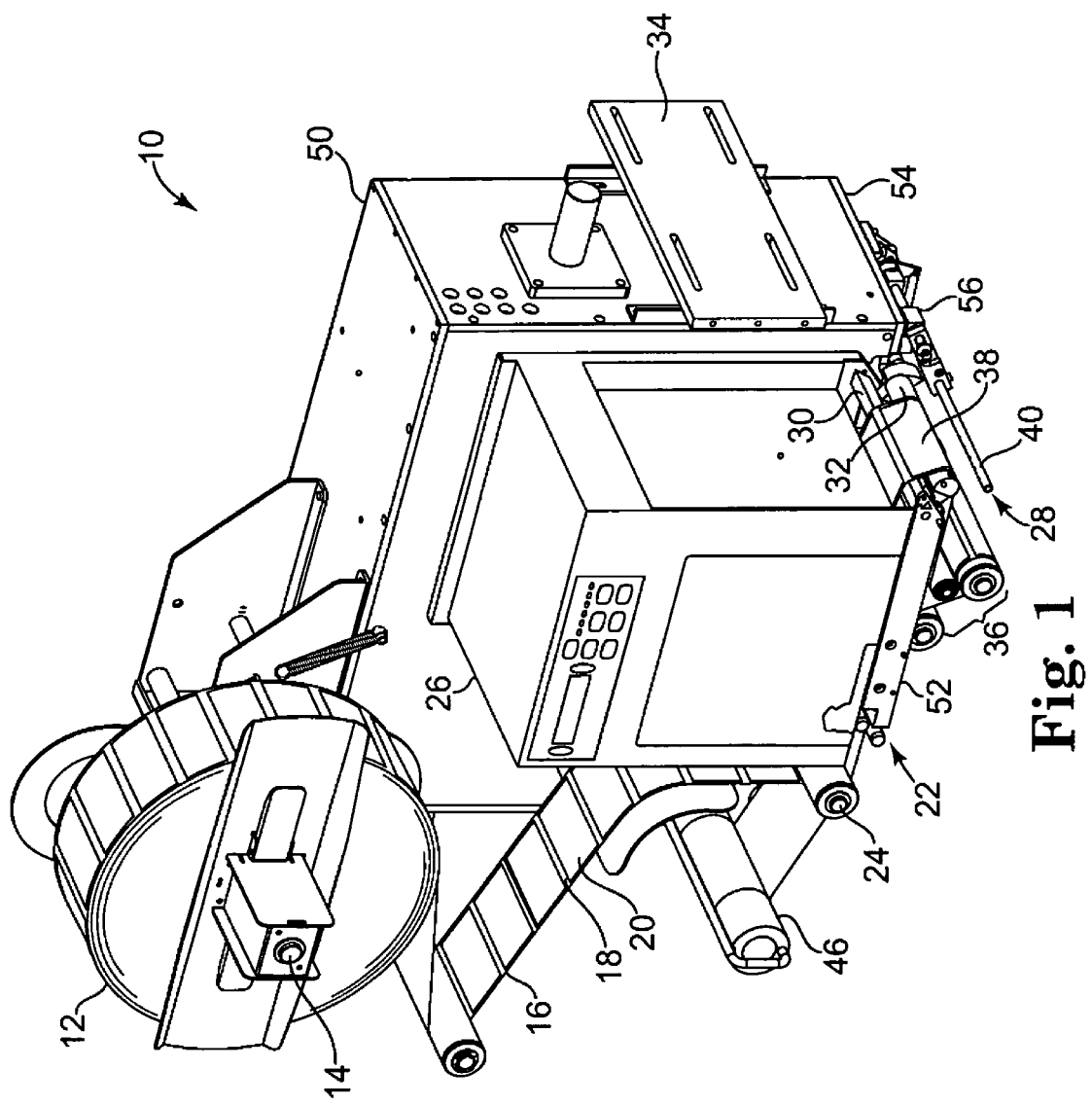
FIG. 1 is a perspective illustration of an RFID dispensing apparatus according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for evaluating and dispensing RFID labels. While the present invention is not necessarily limited to such applications, various aspects of the invention may be appreciated through a discussion of various examples using this context.

FIG. 1 is a perspective illustration of an RFID dispensing apparatus 10 according to an embodiment of the invention. The apparatus includes a supply of RFID labels on roll 12, which is secured on a spindle 14. The roll 12 supplies a web 16 having a carrier surface 18 and RFID labels 20 that are secured thereto with a suitable, releasable adhesive.

The web 16 passes through a drive station 22 including a drive roller 24, which is driven by a motor (not shown). In one embodiment, the motor is a stepper motor. However, other suitable motors, such as a servo motor, may be employed. The web is advanced beneath RFID programmer module 26, and the programmer module programs the labels as they pass beneath the module. The web 16 is carried to a dispensing location 28, at which peel bar 30 and cam bar 32 cooperatively separate labels from the web. A label tamper (not shown) mounts to bracket 34 and forces a label separated from the web onto an article below the tamper. The web 16 is fed through various idler rollers 36 to a take up spindle 46.

Whether an RFID label is separated from the web 16 depends on the position of the cam bar 32. In FIG. 1, cam bar 32 is in a reject position (see also FIG. 2), which causes an advancing RFID label 38 to remain on the web 16. When cam bar 32 is in an apply position (see FIG. 3, for example) an RFID label is separated from the web for application to an article. An RFID label separates from the web 16 as a result of the sharp angle introduced in the path of travel of the web by the peel bar 30. A pneumatic tube 40 is positioned to provide a current of air to lift a label as it peels from the web 16 for application to an advancing article. The pneumatic tube is ventilated at positions suitable for causing a separated label to rise.

When the cam bar 32 is in the reject position, (FIGS. 1 and 2) the path of the web 16 is extended beyond the peel bar 30, which effectively destroys the peel angle (the angle at which an RFID label would detach from the web). The rejected RFID label 38 remains attached to the web 16, and the rejected label 38 is carried by the web 16 to the take up wheel 46 as illustrated.

Label dispensing apparatus 10 is a modular system. A chassis 50 supports the RFID programmer module 26, the tamper that mounts to bracket 34, supply spindle 15 and take-up wheel 46. In addition, carriage assembly 52 is mounted below the programmer module 26, and bottom assembly 54 is mounted to the bottom of chassis 50.

Figure 3:
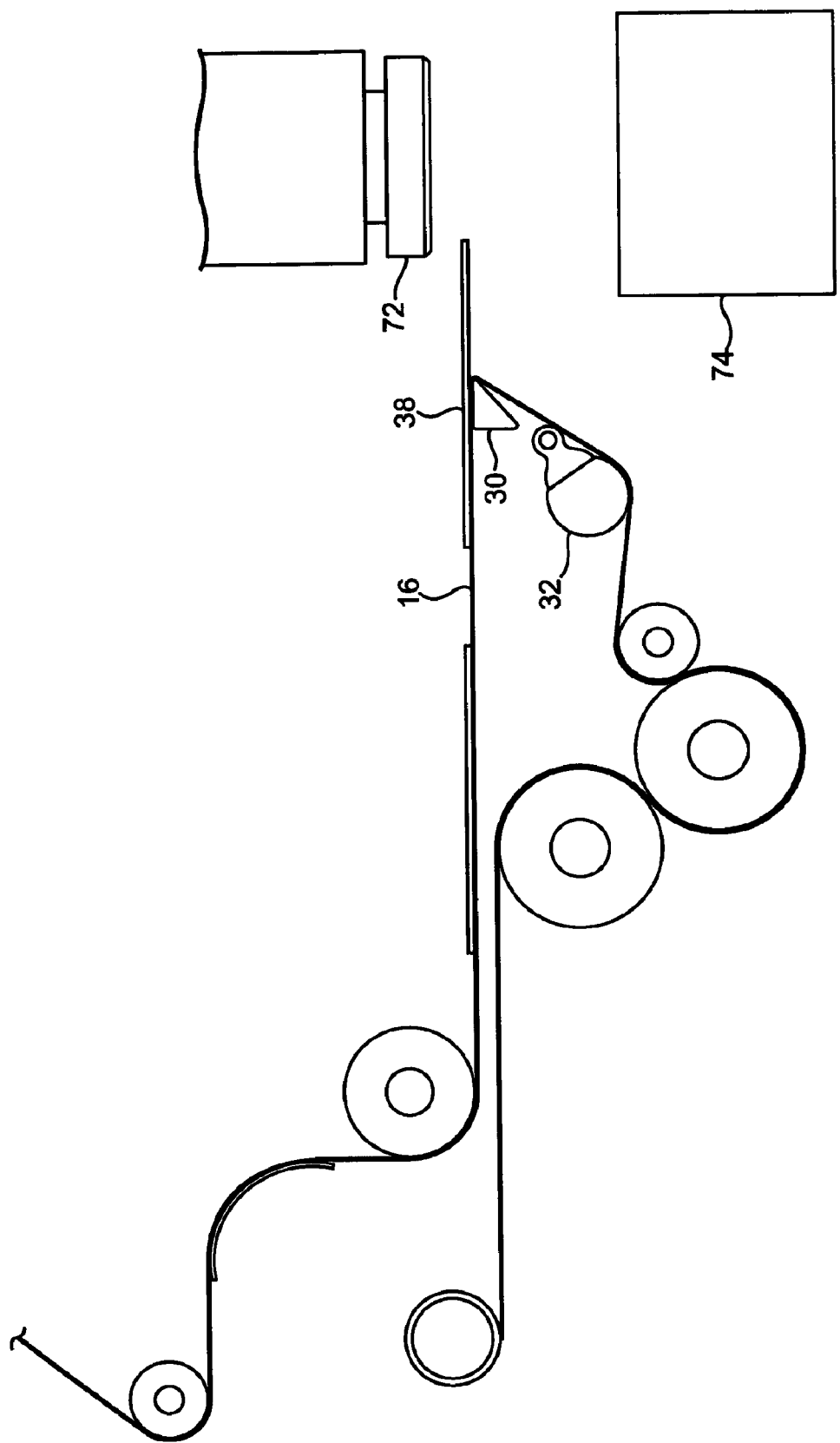
FIG. 3 is a partial side view of components of the RFID dispensing apparatus with the cam bar in an apply position for separating a programmed RFID label from the label web.
Figure 4:
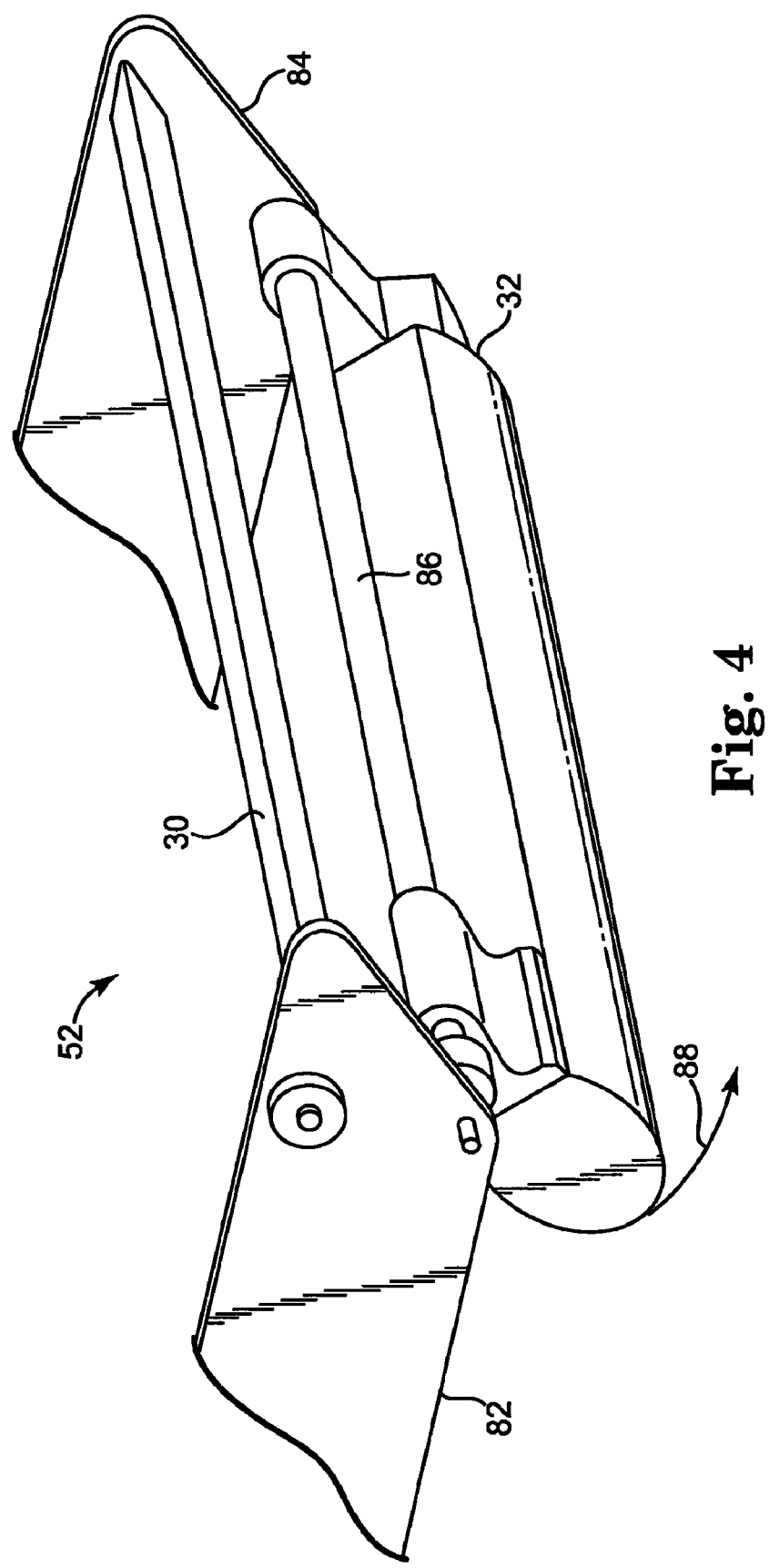
FIG. 4 is a perspective view of a carriage assembly having a peel bar and a cam bar mounted thereon.

The carriage assembly 52 supports the peel bar 30 and the cam bar 32 (see also FIG. 4). The peel bar is fixedly mounted on the carriage assembly 52, and the cam bar is mounted on the carriage assembly in a manner that allows the bar to be rotated to the reject position (as shown in FIG. 1) in response to a failure to program an RFID label, and to be rotated to an apply position (as shown in FIG. 3) when programming of the RFID label is successful.

The bottom assembly 54 mounts to the bottom of chassis 50 and has mounted thereon idler rollers 36 and pneumatic tube assembly 56. In addition, movement of the cam bar 32 is actuated with pneumatic linkage (not shown in FIG. 1), and the pneumatic linkage is mounted on the bottom assembly 54. In the example embodiment, the cam bar 32 is mounted on the carriage assembly 52, but movement of the cam bar is actuated from structure on bottom assembly 54.

Figure 2:
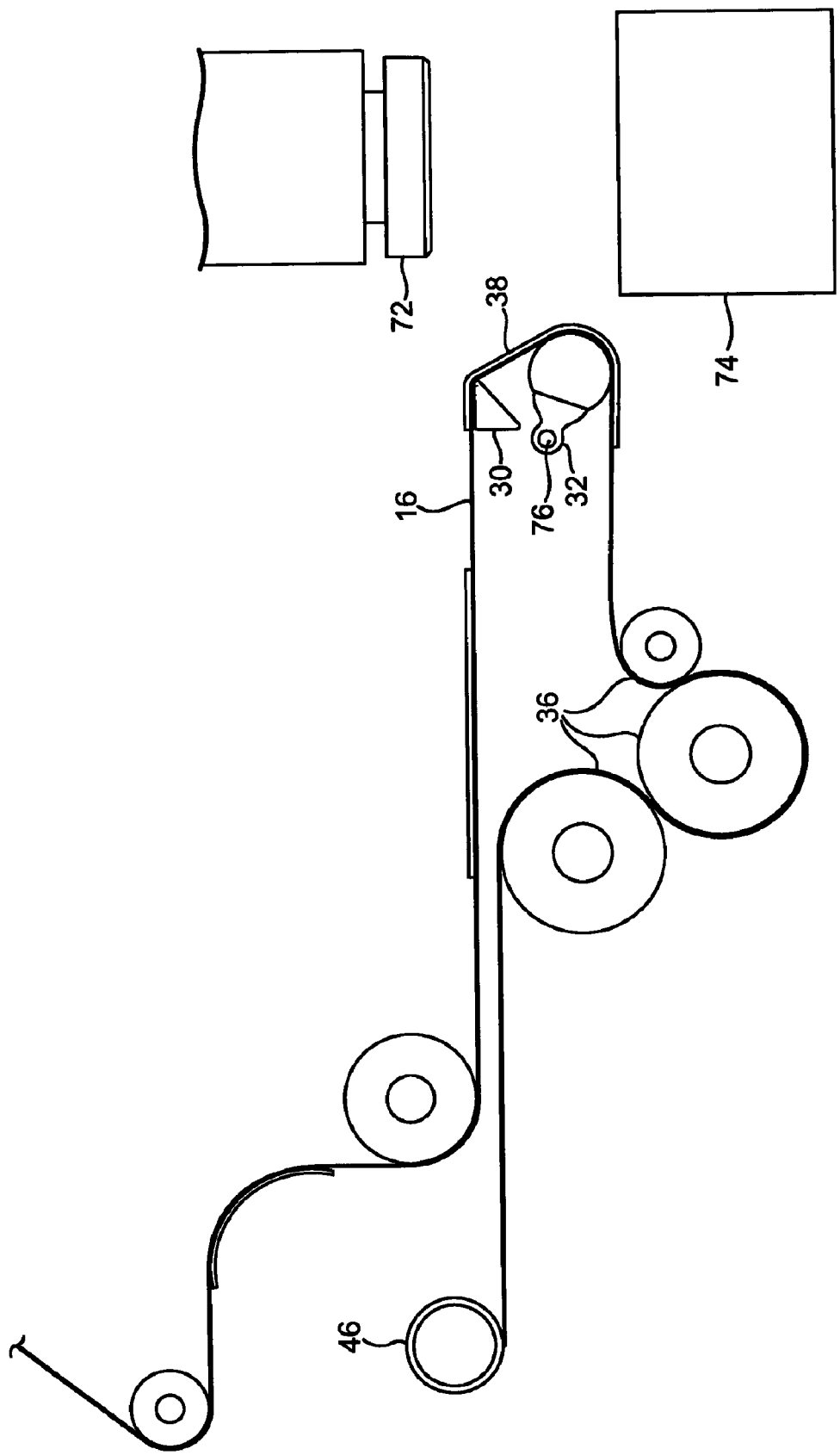
FIG. 2 is a partial side view of components of the RFID dispensing apparatus with a cam bar in a reject position for preserving a rejected RFID label on a label web.

FIG. 2 is a partial side view of components of the RFID dispensing apparatus with the cam bar 32 in a reject position for preserving a rejected RFID label on a label web. The view also illustrates the positions of the peel bar 30 and cam bar 32 relative to a tamper 72 and article 74 to which a label is to be applied.

Cam bar 32 is rotated about pivot point 76 and toward the article 74 when a label is rejected. The reject position of cam bar 32 extends the path of the web 16 such that the peel angle introduced by peel bar 30 is destroyed. The cam bar in the reject position causes the label 38 to remain affixed to the web 16 and recovered to take-up wheel 36. By preserving the label on the web, the label may be returned to the manufacturer for fault analysis and application of a credit to the label customer.

FIG. 3 is a partial side view of components of the RFID dispensing apparatus with the cam bar 32 in an apply position for separating a programmed RFID label from the label web. Cam bar 32 is rotated about pivot point 76 and away from article 74 when a label is to be applied. The apply position of cam bar 32 changes the path of the web 16 such that the peel angle is introduced by peel bar 30. The cam bar in the apply position causes the label 38 to separate from the web 16. A current of air from air tube 40 (not shown in FIG. 3 but shown in FIG. 1) forces the label toward tamper for application to article 74.

FIG. 4 is a perspective view of carriage assembly 52 having a peel bar 30 and a cam bar 32 mounted thereon. The peel bar 30 is fixedly mounted to the carriage assembly 52 on side members 82 and 84 of the assembly. Any suitable attachment mechanism may be used such that a peel angle may be introduced into the path of the web (not shown in FIG. 4) traveling over the peel bar. Size, material, position, and other attributes of the peel bar may vary according to implementation requirements. Those skilled in the art will recognize other suitable alternative shapes for the peel bar. For example, instead of wedge shaped, the peel bar could be a round bar having a radius small enough to cause the separation of the RFID label from the web carrier when the web carrier travels partially around the bar. Also, those skilled in the art will recognize that even though the illustrated peel bar 30 is wedge shaped, the edge at some level of magnification is actually rounded with a small radius. The radius or sharpness of the edge may vary by application.

The cam bar 32 is also mounted to the carriage assembly on side members 82 and 84. The mounting of the cam bar permits the cam bar to be rotated between reject and apply positions. In FIG. 4, the cam bar is in the apply position. In moving to the reject position, the bar rotates about an axis generally formed along shaft 86 in the direction indicated by arrow 88. Any suitable attachment mechanism may be used for the cam bar such that the cam bar may be between apply and rejection positions. Size, material, position, and other attributes of the cam bar may vary according to implementation requirements.

Figure 5:
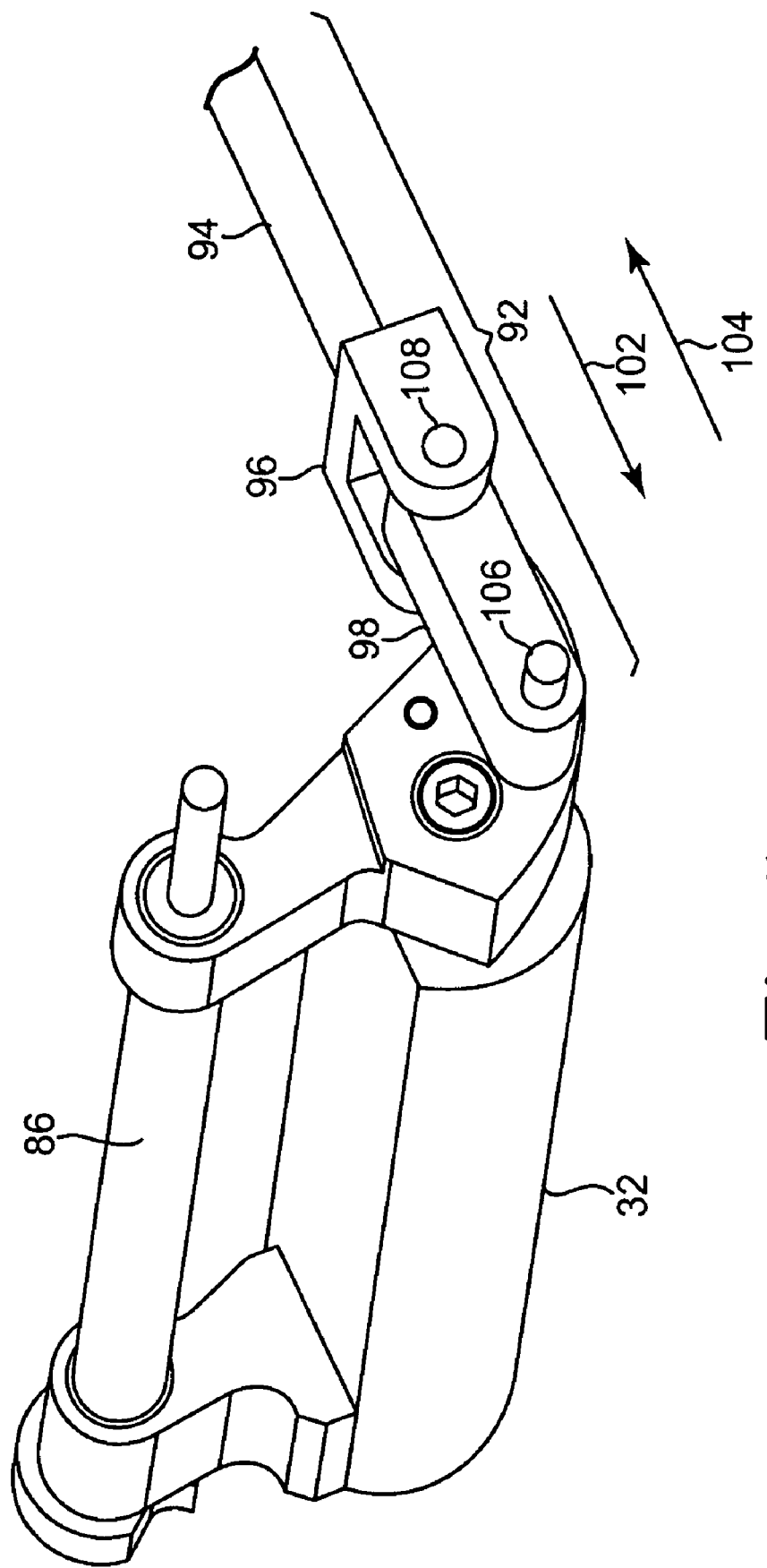
FIG. 5 is a perspective view of the cam bar and linkage assembly for moving the bar between reject and apply positions.
Figure 7:
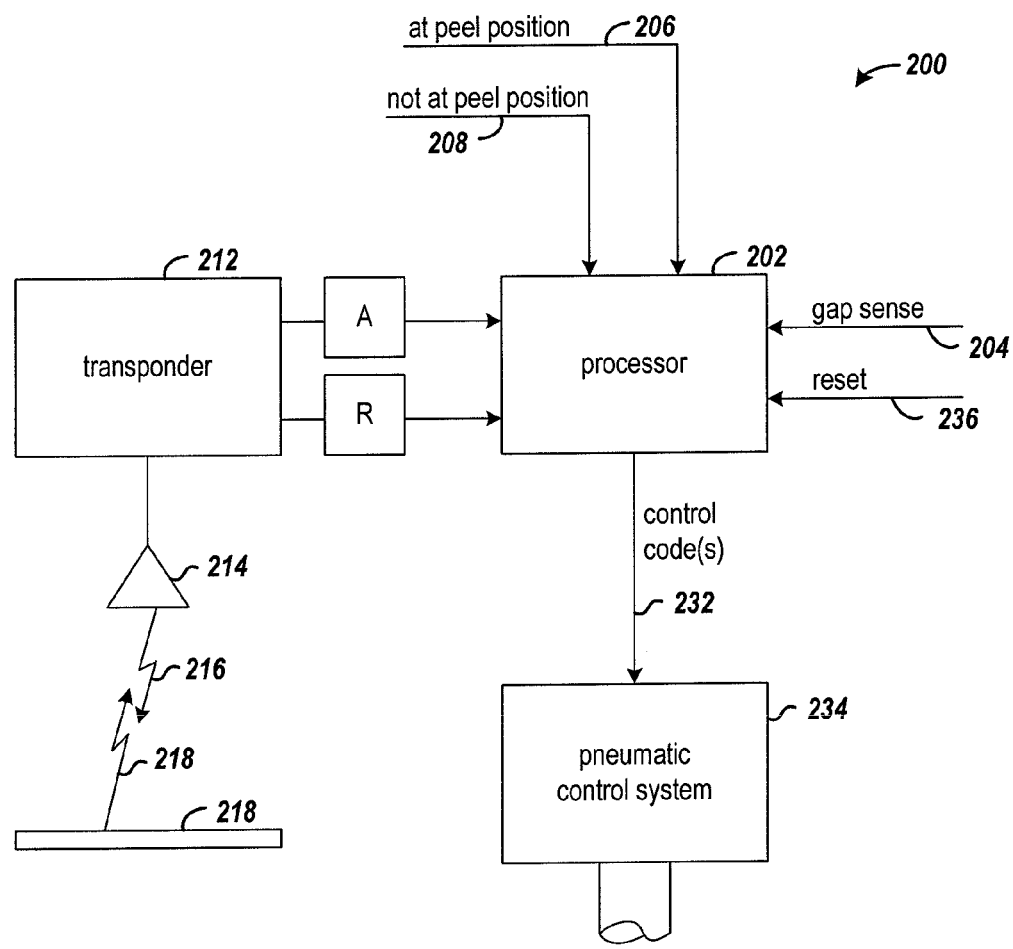
FIG. 7 is a block diagram of a control system for programming RFID labels, controlling advancement of the label web, and positioning the cam bar in the apply and reject positions according to the success or failure of programming an RFID label.

FIG. 5 is a perspective view of the cam bar 32 and the linkage assembly 92 for moving the bar between reject and apply positions. The linkage assembly in the example embodiment includes push bar 94, first linkage member 96, and second linkage member 98. Push bar 94 is coupled to a pneumatic control system (FIG. 7). An increase in air pressure causes the push bar 94 to push the cam bar 32 in the direction of arrow 102. A decrease in air pressure causes the push bar 94 to pull the cam bar 32 in the direction of arrow 104.

The first linkage member 96 is fixedly mounted to push bar 94. The second linkage member 98 is mounted to both the cam bar 32 and to the second linkage member 96 in a manner that permits the second linkage member to rotate at both mount points 106 and 108. Size, material, position, and other attributes of the components of the linkage assembly 92 may vary according to implementation requirements. In another embodiment, the cam bar 32 may be moved between the reject and apply positions by electromechanical means. Furthermore, the push bar need not be connected to the cam bar and instead could engage the cam bar with surface-to-surface application of force.

Figure 6:
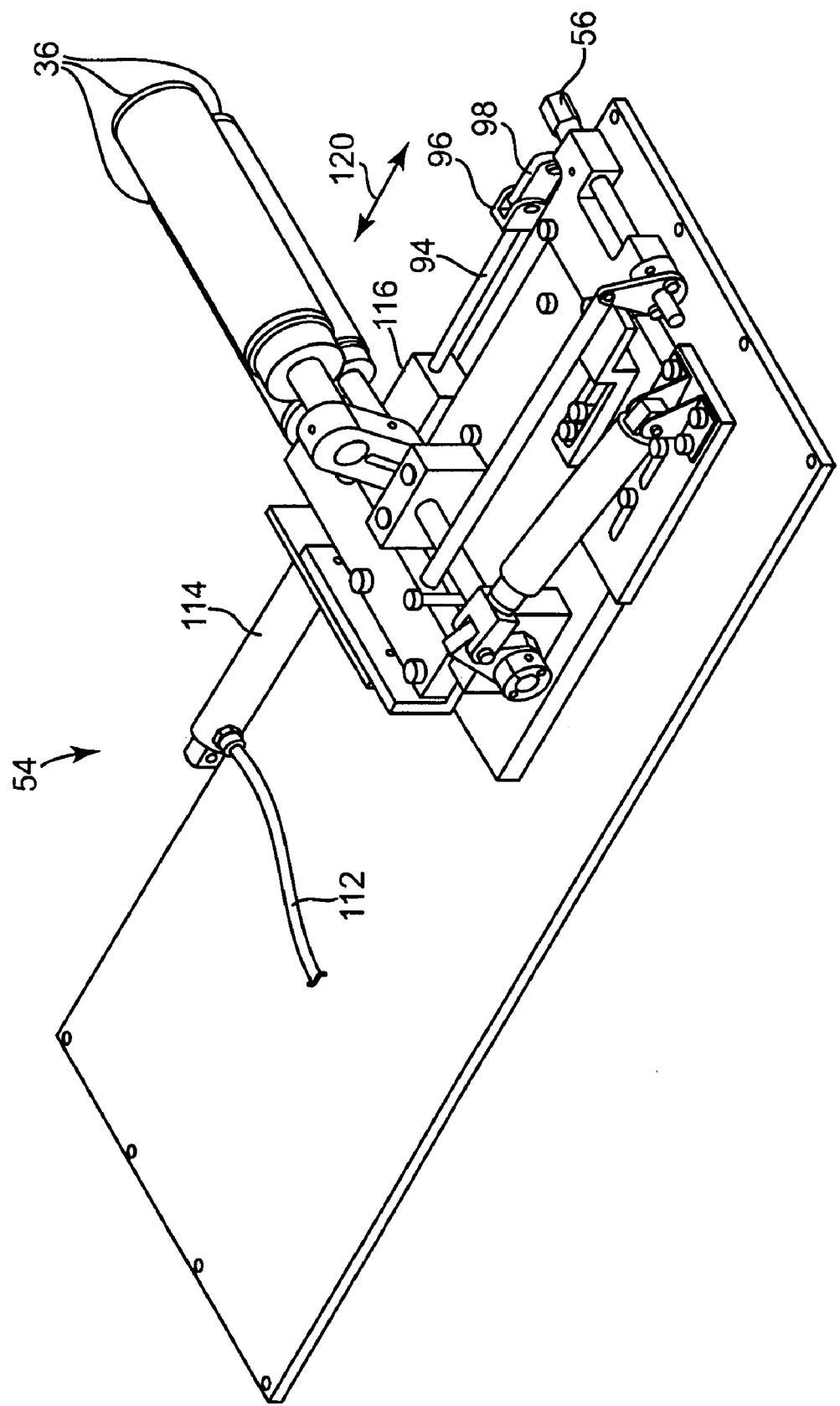
FIG. 6 is a perspective view of a bottom assembly on which the pneumatic actuator of the cam bar (FIG. 1) is mounted.

FIG. 6 is a perspective view of a bottom assembly 54 on which the pneumatic actuator of the cam bar (FIG. 1) is mounted. The pneumatic actuator includes pneumatic supply tube 112, pressure chamber 114, block 116, along with the push bar 94, first linkage member 96, and second linkage member 98 as described above. In addition to the pneumatic actuator, the bottom assembly 54 includes air tube assembly 56 (without the pneumatic tube in order to not obstruct the diagram), idler rollers 36, and the assembly for moving the idler rollers for adjusting tension in the web.

Air pressure from the pneumatic control system (FIG. 7) is provided to the pneumatic actuator via pneumatic supply tube 112. The supply tube 112 provides a flexible routing of pneumatic pressure and is connected to the pneumatic chamber 114, which provides a stable reservoir for regulating pressure applied to the push bar 94.

Block 116 is pneumatically coupled to pneumatic chamber 114, and push bar 94 extends from and retracts into block 116 in a plunger-type action in the direction of arrow 120 in response to changes in pressure from the pneumatic supply tube 112.

FIG. 7 is a block diagram of a control system 200 for programming RFID labels, controlling advancement of the label web, and positioning the cam bar in the apply and reject positions according to the success or failure of programming an RFID label. The control system 200 includes a processor 202 which has a plurality of inputs and outputs hereinafter as discussed. The processor 202 is programmable to perform various control functions.

A gap sensor (not shown) is positioned adjacent the web 16 in order to detect a trailing edge of each RFID label as it passes, and a gap sense signal is input to the processor 202 on line 204. Input signals on lines 206 and 208 indicate to the processor whether the cam bar 32 is in the peel position or reject position, respectively.

A transponder unit 212 has an output antenna 214 for transmitting an activation signal 216 to the RFID label 218. If operative, the RFID label is responsive to the activation signal 216 and produces an output or verification signal 220 for transmission to the antenna 214 and the transponder 212. If the verification signal 220 produced by the RFID label 218 indicates successful programming, the transponder 212 produces an accept output A indicative of an acceptable RFID label. If the verification signal 220 indicates unsuccessful programming, the transponder 212 produces a reject output R. The accept output A and the reject output R are coupled for input to the processor 202.

In response to an accept output A, the processor 202 produces a first control code 232 (or activation signal) for the pneumatic control system 234, which causes the pneumatic control system to reduce pneumatic pressure in order to move the cam bar 32 to the apply position (FIG. 3). In response to a reject signal R, the processor 202 produces a second control code 232 (or deactivation signal) which causes the pneumatic control system 234 to increase pneumatic pressure in order to move the cam bar 32 to the reject position (FIG. 2).

Figure 8:
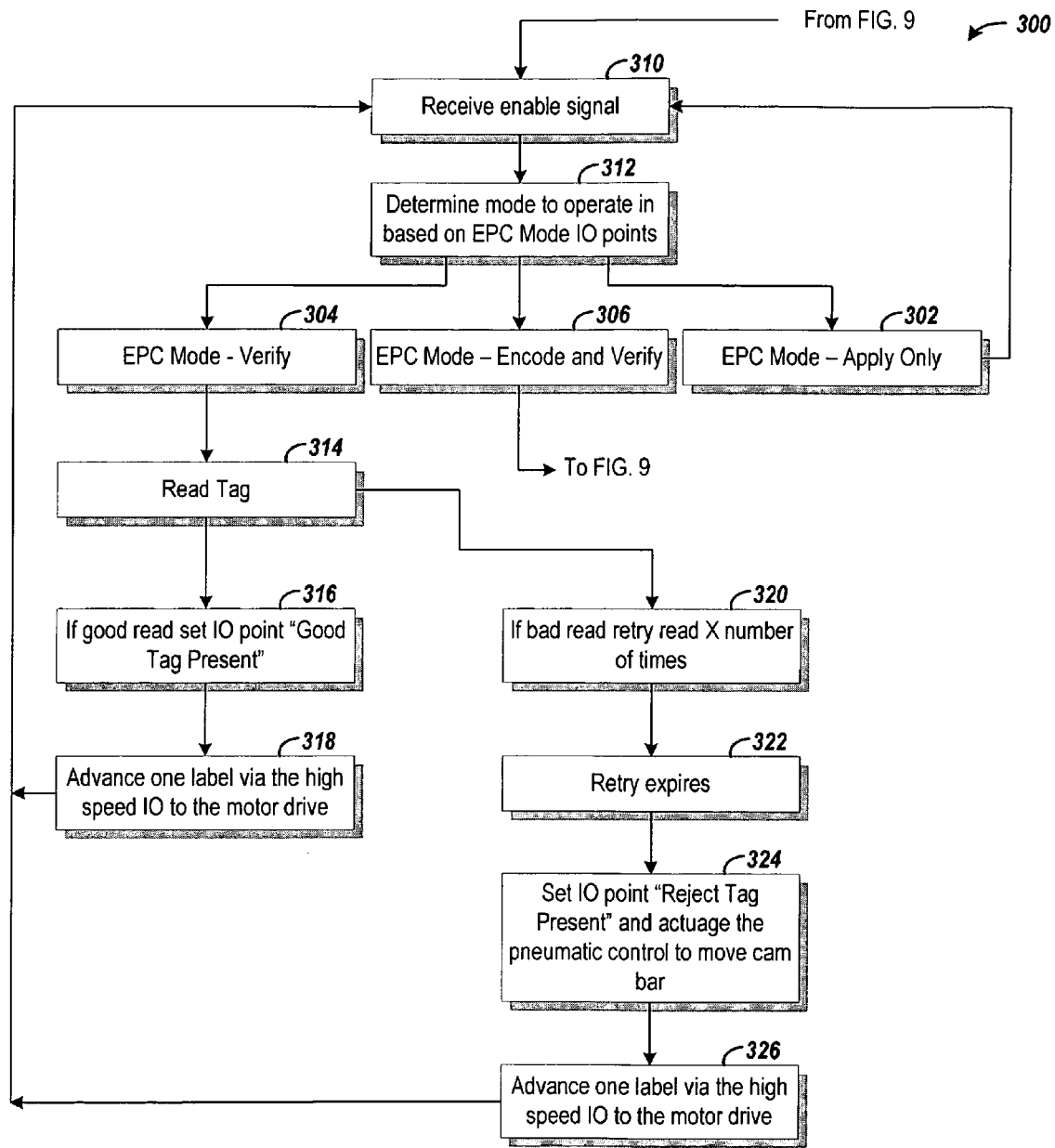
FIG. 8 is a flowchart of an example process for operation of the control system of FIG. 7.

FIG. 8 is a flowchart of an example process 300 for operation of the control system of FIG. 7. The present invention is operable in a variety of modes, including an electronic product code (EPC) Apply Only mode 302; an EPC Verify Mode 304; and an EPC Encode and Verify Mode 306. In the Apply Only Mode 302, the label is simply applied to the advancing article without checking the operability of the RFID label. In the Verify mode 304, the RFID label is applied to the advancing article in accordance with the operability of the RFID, or it is rejected if inoperable. In the Encode and Verify mode 306, the RFID label is first encoded with data specific to the product and is thereafter tested to verify operability before application to the advancing article.

An enable signal 310 initiates operation of the device. Mode selection occurs at 312. For Verify Mode 304, the verification sequence includes initiating a Read Tag operation at 314, whereupon a signature is produced to activate the RFID. If the appropriate verification response is received, a Good Tag Present output is produced at 316. The Good Tag Present output causes the drive to advance one label at high speed to the application location, whereupon the label peels from the web at block 318.

In an example embodiment, the cam bar 32 defaults to the peel position. If the Read Tag signal 314 does not result in an appropriate response, the Bad Read block 320 produces an output which initiates a selected number of attempts at Retry block 322 to verify the operability of the tag. If after the selected number of attempts, a Bad Read signal persists, Retry 322 expires and Reject Tag Present is set at 324. The drive moves the web forward at high speed through one label position at 326. If the reject is indicated, the processor signals the pneumatic control system to apply pneumatic pressure and move the cam bar to the reject position, thereby causing the RFID to remain on the web 16.

Figure 9:
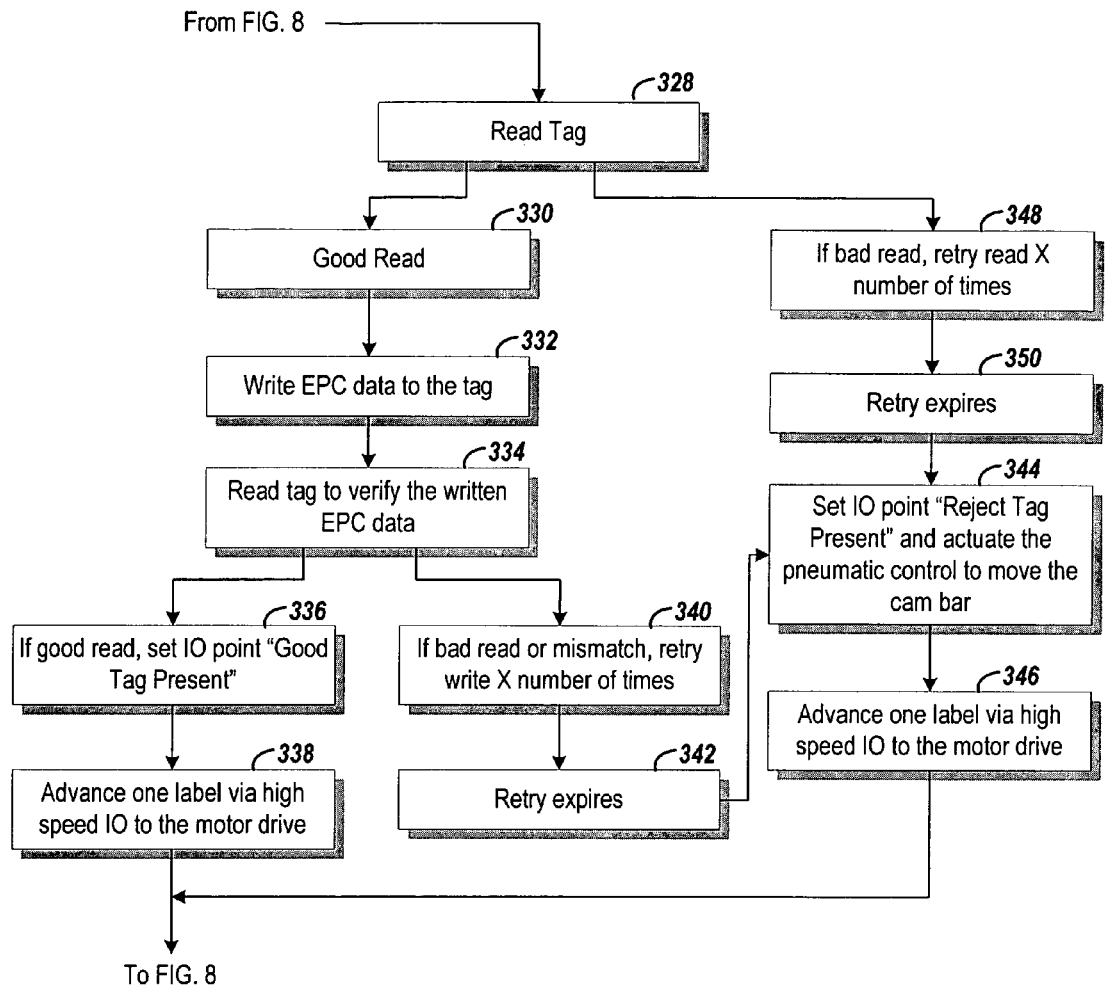
FIG. 9 is a flowchart that further describes the encode and verify mode of operation.

FIG. 9 is a flowchart that further describes the encode and verify mode of operation. The tag is read at Read Tag 328. If a Good Read 330 output is produced, write EPC Data is initiated at block 332. Thereafter, the tag is read again 334 to verify that the data written on the tag is correct. If the data is correct, a Good Tag present output is set block at 336 and the controller sees a Good Tag present signal. This signal advances the web at 338 by one label that reset the module. If verification does not result in a good signal, Read Tag Block 334 produces an output. After a number of retries at 340, Retry Expires at 342. The output of the Retry Expires 342 causes the processor to set Reject Tag present Block 344 and actuate the pneumatic control system to apply pneumatic pressure to move the cam bar to the reject position. The web is advanced by one label at block 346.

If the initial Read Tag step at 328 results in a Bad Read and a selected number of retries are attempted at 348, and the number of retries expires at 150, the process sets the Reject Tag Present at block 344 and continues as described above.

While certain aspects of the present invention have been described with reference to several particular example embodiments, those skilled in the art will recognize that many changes may be made thereto without departing from the spirit and scope of the present invention. Aspects of the invention are set forth in the following claims.

What is claimed is:

1. An apparatus for selectively dispensing radio frequency identification (RFID) labels disposed on a surface of a web carrier, comprising:
   a frame having first and second side members;
   a peel bar mounted between the first and second side members, the peel bar having a radial portion a radius of a size that causes an RFID label to be separated from the surface of the web carrier as the web carrier contacts and travels over the radial portion;
   a cam bar pivotally mounted between the first and second side members of the frame, wherein the cam bar rotated to a first position about an axis that extends between mount points at the first and second side members causes the web carrier to travel path that forms a peel angle at least partially around the radial portion of the peel bar, and the cam bar rotated to a second position with the peel bar remaining stationary relative to the frame causes the web carrier to travel a path at least partially around the radial portion of the peel bar without forming the peel angle and causes the web carrier to contact and travel at least partially around a curved surface of the cam bar.

2. The apparatus of claim 1, further comprising a pneumatically actuated push bar in contact with one end of the cam bar for rotating the cam bar between the first and second positions.

3. The apparatus of claim 1, wherein the curved surface of the cam bar has a radius of a size that does not cause an RFID label to separate from the web carrier as the web carrier contacts and travels over the curved surface of the cam bar.

4. The apparatus of claim 1, wherein the peel bar has a first planar surface that meets the radial portion and a second planar surface that meets the radial portion, and the surfaces of the peel bar form a wedge.

5. The apparatus of claim 2, further comprising:
   a transponder coupled to the processor, the transponder configured to transmit an activation signal to an RFID label disposed on the web, receive a verification signal from an RFID, and output a status code indicative of a state of the verification signal;
   a processor coupled to the transponder, the processor configured to output a control code for controlling the position of the cam bar;
   a pneumatic control system coupled to the processor and connected to the push bar via a pneumatic tube arrangement, the pneumatic control system configured to apply a first level of pneumatic pressure to the pneumatic tube arrangement sufficient to extend the push bar and rotate the cam bar to the second position responsive to a first value of the control code, and apply a second level of pneumatic pressure to the pneumatic tube arrangement sufficient to pull the push bar and rotate the cam bar to the first position responsive to a second value of the control code.

6. The apparatus of claim 4, wherein the peel bar is fixedly mounted to the first and second side members of the frame.

7. The apparatus of claim 1, further comprising:
   a chassis, wherein the frame is mounted on the chassis;
   a base mounted adjacent to the frame on the chassis;
   a pneumatic pressure chamber mounted on the base; and
   a push bar mounted on the base and actuated by pneumatic pressure from the pressure chamber, wherein the push bar is in contact with the cam bar and an increase in pressure in the pressure chamber forces the push bar toward the cam bar.

8. The apparatus of claim 7, wherein the second surface of the cam bar is a curved surface over which the web carrier travels when the cam bar is in the first position, and the second curved surface has a radius of a size that does not cause an RFID label to separate from the web carrier as the web carrier contacts and travels over the curved surface of the cam bar.

9. The apparatus of claim 7, wherein the peel bar has a first planar surface that meets the first surface and a second planar surface that meets the first surface, and the surfaces of the peel bar form a wedge.

10. The apparatus of claim 7, further comprising:
    a transponder coupled to the processor, the transponder configured to transmit an activation signal to an RFID label disposed on the web, receive a verification signal from an RFID, and output a status code indicative of a state of the verification signal;
    a processor coupled to the transponder, the processor configured to output a control code for controlling the position of the cam bar;
    a pneumatic control system coupled to the processor and connected to the push bar via an pneumatic tube arrangement, the pneumatic control system configured to apply a first level of pneumatic pressure to the pneumatic tube arrangement sufficient to extend the push bar and rotate the cam bar to the second position responsive to a first value of the control code, and apply a second level of pneumatic pressure to the pneumatic tube arrangement sufficient to pull the push bar and rotate the cam bar to the first position responsive to a second value of the control code.

11. The apparatus of claim 8, wherein the peel bar is fixedly mounted to the first and second side members of the frame.

12. An apparatus for selectively dispensing radio frequency identification (RFID) labels disposed on a surface of a web carrier, comprising:
    a chassis;
    a frame having first and second side members mounted on the chassis;
    a base mounted adjacent to the frame on the chassis;
    a pneumatic pressure chamber mounted on the base;
    a peel bar mounted between the first and second side members, the peel bar having an edge with a radius of a size that causes an RFID label to be separated from the surface of the web carrier as the web carrier contacts and travels at least partially around the edge;
    a push bar mounted on the base and actuated by pneumatic pressure from the pressure chamber, wherein the push bar is in contact with the cam bar and an increase in pressure in the pressure chamber forces the push bar toward the cam bar;
    a cam bar pivotally mounted between the first and second side members of the frame, wherein the cam bar rotated to a first position about an axis that extends between mount points at the first and second side members causes the web carrier to travel a path that forms a peel angle around at least partially around the edge of the peel bar, and the cam bar rotated to a second position with the peel bar remaining stationary relative to the frame causes the web carrier to travel a path at least partially around the edge of the peel bar without forming the peel angle;

a supply spindle mounted on the chassis and positioned to supply the web carrier to the frame and peel bar; and a take-up spindle mounted on the chassis and positioned to wind the web carrier from the frame and peel bar.

13. The apparatus of claim 12, wherein the cam bar has a curved surface over which the web carrier travels when the cam bar is in the first position, and the curved surface has a radius of a size that does not cause an RFID label to separate from the web carrier as the web carrier contacts and travels over the curved surface of the cam bar.

14. The apparatus of claim 12, wherein the peel bar has a first planar surface that intersects with a second planar surface, and the intersection forms the edge.

15. The apparatus of claim 12, further comprising:

a transponder coupled to the processor, the transponder configured to transmit an activation signal to an RFID label disposed on the web, receive a verification signal from an RFID, and output a status code indicative of a state of the verification signal;

a processor coupled to the transponder, the processor configured to output a control code for controlling the position of the cam bar;

a pneumatic control system coupled to the processor and connected to the pneumatic chamber via an pneumatic tube arrangement, the pneumatic control system configured to apply a first level of pneumatic pressure to the pneumatic tube arrangement sufficient to extend the push bar and rotate the cam bar to the second position responsive to a first value of the control code, and apply a second level of pneumatic pressure to the pneumatic tube arrangement sufficient to pull the push bar and rotate the cam bar to the first position responsive to a second value of the control code.

16. The apparatus of claim 12, wherein the peel bar is fixedly mounted to the first and second side members of the frame.

17. An apparatus for selectively dispensing radio frequency identification (RFID) labels disposed on a first surface of a web carrier, the web carrier having a second surface, comprising:

means for advancing the web carrier;

means for programming each RFID label on the advancing web carrier;

means for determining success or failure to program an RFID label;

a frame having first and second side members;

a peel bar positioned to contact the second surface of the advancing web carrier, the peel bar having a peel edge with a radius of a size that causes an RFID label to be separated from the first surface of the web carrier as the second surface of the web carrier contacts and travels at least partially around the edge;

wherein the peel bar is mounted to the first and second side members of the frame;

a cam bar positioned to contact the second surface of the advancing web carrier, wherein the cam bar moved to a first position causes the second surface of the web carrier to travel a path that forms a peel angle at least partially around the edge of the peel bar, and the cam bar moved to a second position with the peel bar remaining stationary relative to the frame causes the second surface of the web carrier to travel a path at least partially around the edge of the peel bar without forming the peel angle, wherein an RFID label remains affixed to the web carrier when the cam bar is in the second position and the web carrier advances over the peel bar;

means, responsive to a success in programming an RFID label, for moving the cam bar to the first position;

means, responsive to a failure in programming an RFID label, for moving the cam bar to the second position; and means for winding the advancing web carrier following advancement past the cam bar.

* * * * *